Figure 1:
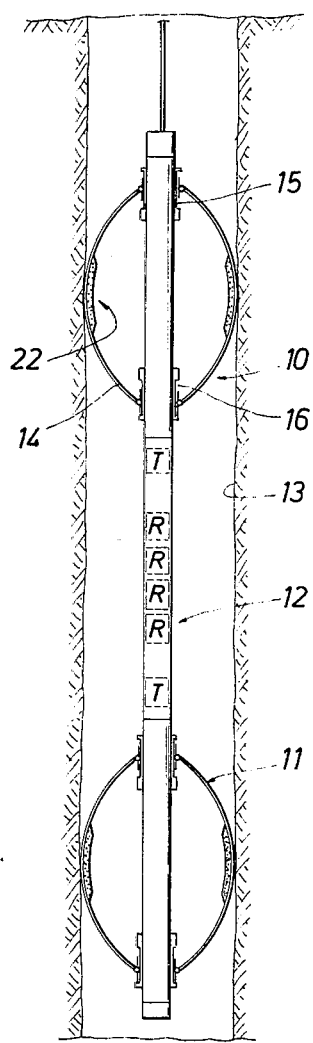

United States Patent [19]
Escaron

[11] 3,991,850
[45] Nov. 16, 1976

[54] NOISE-ATTENUATING POSITIONERS FOR ACOUSTIC WELL-LOGGING TOOLS

[75] Inventor: Pierre C. Escaron, Houston, Tex.

[73] Assignee: Schlumberger Technology Corporation, New York, N.Y.

[22] Filed: Jan. 8, 1975

[21] Appl. No.: 539,555

[52] U.S. Cl. ............................ 181/102; 166/241; 308/4 A
[51] Int. Cl.² .................... G01V 1/40; E21B 17/10
[58] Field of Search ............ 181/102, 105; 308/4 A; 166/241; 340/15.5 BA

[56] References Cited
UNITED STATES PATENTS

| | | | |
|---|---|---|---|
| 2,191,121 | 2/1940 | Slichter | 181/102 |
| 2,396,935 | 3/1946 | Walstrom | 181/102 |
| 2,695,820 | 11/1954 | Segesman | 166/241 |
| 3,181,645 | 5/1965 | Blizard | 340/15.5 BH |
| 3,564,914 | 2/1971 | Desai et al. | 181/102 |
| 3,749,168 | 7/1973 | Hall | 166/241 |
| 3,794,976 | 2/1974 | Mickler | 340/15.5 BH |
| 3,883,841 | 5/1975 | Norel et al. | 181/102 |

Primary Examiner—Nelson Moskowitz
Attorney, Agent, or Firm—Ernest R. Archambeau, Jr.; William R. Sherman; Stewart F. Moore

[57] ABSTRACT

In the representative embodiment of the new and improved apparatus disclosed herein for positioning acoustic well-logging tools, outwardly-bowed elongated spring members of a wear-resistant metal are cooperatively spaced around the body of an acoustic-logging tool and arranged as required for maintaining the tool substantially centered within a well bore. To at least minimize or significantly attenuate the acoustic noise inherently generated by the rubbing of the outward faces of the spring members along the well bore walls which noise may otherwise unduly interfere with the reception of the acoustic logging signals, the inward faces of at least the mid portions of the several spring members are respectively covered with a composite material including an elastomer containing a substantial number of small embedded particles or interspersed balls of a sound-absorbing material such as lead.

16 Claims, 2 Drawing Figures

NOISE-ATTENUATING POSITIONERS FOR ACOUSTIC WELL-LOGGING TOOLS

Those skilled in the art will, of course, appreciate that with typical sonic or acoustic logging tools using multiple transmitting and receiving transducers, more-accurate measurements are obtained where the tool is maintained in a centered position within the well bore. Accordingly, it is customary to mount bowspring centralizers on the upper and lower ends of such acoustic logging tools, with these centralizers being cooperatively arranged for sliding engagement with a well bore wall and to yield as required for accommodating diametrical variations in the well bore. Typically, these centralizers employ a set of either three or four elongated, outwardly-bowed leaf springs which are uniformly disposed around the tool body and have their ends slidably coupled to the body to allow the spring members to deflect in unison. Other bowspring centralizers of this nature are also arranged as shown in U.S. Pat. No. 3,097,433 and U.S. Pat. No. 3,555,689 to provide additional tool-centralizing forces where the logging tool is to be operated in inclined well bores.

In any event, it will be realized that the centralizers usually employed with acoustic logging tools ordinarily have at least six centralizing springs which are maintained in sliding contract with the walls of the well bore through which the tool is passing. As a result, it is widely recognized that this sliding engagement of the bowspring members will generate a significant amount of broad-band acoustic noise in the well bore as the logging tool is being moved therethrough. Tests have shown that although much of this so-called "road" noise is in a frequency spectrum somewhat lower than the typical operating frequencies ordinarily used for acoustic logging tools, this noise nevertheless contains sufficient higher-frequency components to represent a significant noise level at these operating frequencies. This will, of course, cause needless interference to the reception of particularly-weak acoustic logging signals.

Accordingly, it is an object of the present invention to provide new and improved apparatus for positioning acoustic well-logging tools without producing significant noise interference at the operating frequencies of the logging tools as they are moved through a well bore.

This and other objects of the present invention are attained by mounting one or more wall-engaging positioning members on the body of an acoustic logging tool which are cooperatively arranged for maintaining the logging tool in a selected position in a well bore. To at least reduce the level of acoustic noise inherently generated as the outward wall-engaging surfaces of the positioning members slide along the walls of a well bore, a composite noise attenuator substantially consisting of an elastomer containing a substantial number of interspersed particles of a sound-dampening material is mounted on at least a portion of those inward surfaces of the positioning members which are not in rubbing contact with the well bore walls.

Figure 2:
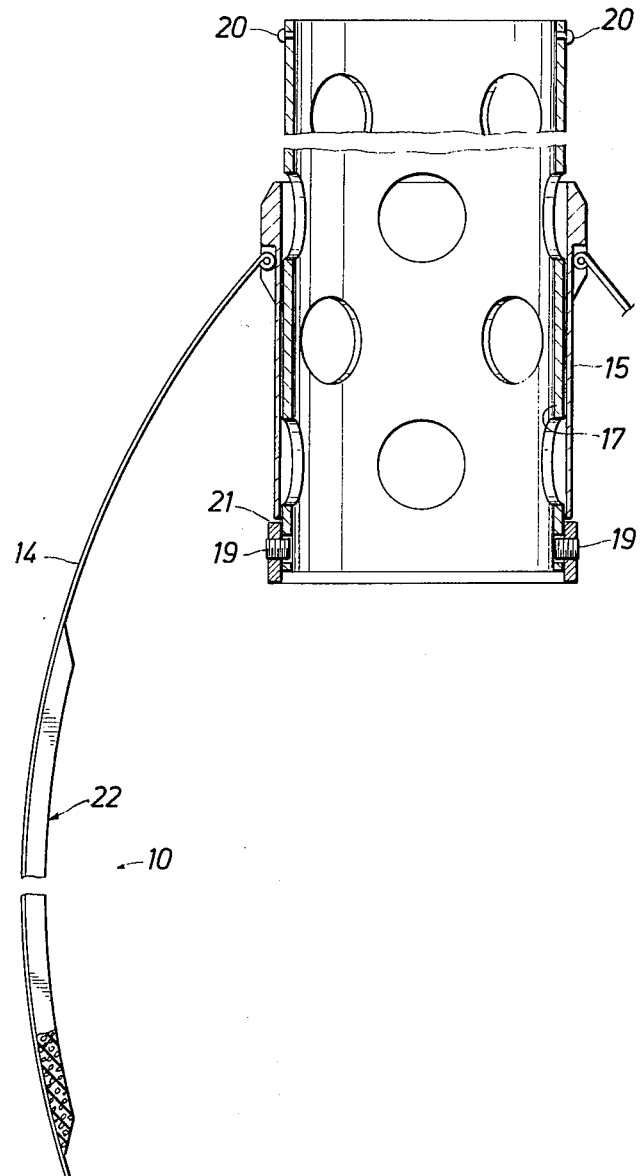
Figure 2:
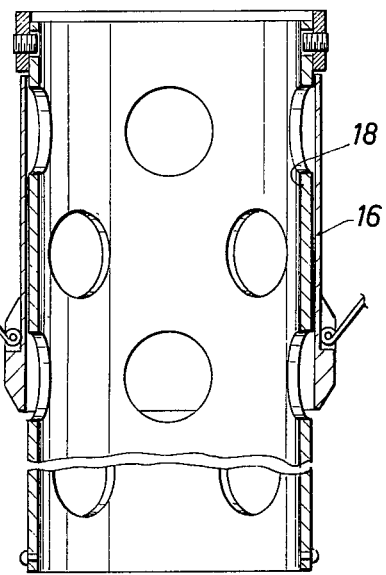

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 depicts a typical acoustic logging tool disposed in a well bore and retained in a centered position therein by new and improved centralizing apparatus arranged in accordance with the principles of the present invention; and FIG. 2 is an enlarged cross-sectional view of portions of one of the new and improved tool centralizers shown in FIG. 1.

Turning now to FIG. 1, two new and improved tool centralizers 10 and 11 arranged in accordance with the principles of the present invention are illustrated as they will appear when mounted on the upper and lower ends of a typical acoustic logging tool 12. As depicted, the logging tool 12 is being moved upwardly along a well bore, such as an uncased borehole 13, for obtaining selected measurements representative of one or more acoustic properties of the adjacent earth formations. As previously mentioned, where the acoustic logging tool 12 is arranged in accordance with U.S. Pat. No. 3,304,536, for example, it is of significance that the tool be maintained in substantial coaxial alignment with the axis of the borehole 13.

Accordingly, in the preferred embodiment of the new and improved centralizers 10 and 11, each of the centralizers includes at least three pre-formed, outwardly-bowed leaf springs, as at 14, preferably of steel and which are disposed at uniform intervals around the body of the tool 12 with their respective upper and lower ends being pivotally coupled to annular collars, as at 15 and 16, that are slidably mounted on the body of the tool. Although the collars 15 and 16 could, of course, be slidably coupled directly to the body of the logging tool 12, it is preferred to respectively mount these collars on upper and lower attachment sleeves 17 and 18 which are, in turn, releasably secured to the tool body as by one or more set screws 19. In this manner, the sleeves 17 and 18 may be readily located along the body of the logging tool 12 as may be required for selectively establishing the longitudinal spacing between the upper and lower ends of the centralizing springs, as at 14, and thereby defining the extent of available lateral movement for the mid-portions of the elongated springs.

As is typical, the slidable collars, as at 15, are adapted for sliding movement between longitudinally-spaced abutments, as at 20 and 21, arranged on the sleeves, as at 17, with the upper abutment determining the positions of the upper collar 15, for example, when the bow springs 14 are collapsed against the body of the tool 12 and the lower abutment determining the position of the upper collar when the bow springs are fully extended. Those skilled in the art will appreciate, of course, that when the logging tool 12 is being pulled upwardly in the borehole 13, the upper and lower centralizers 10 and 11 shift downwardly in relation to the tool body until the lower collars, as at 16, engage the lower abutments on their respective support sleeves as at 18; and that the upper collars, as at 15, will move freely between the abutments, as at 20 and 21, on the upper support sleeves, as at 17, in accordance with variations in the diameter of the borehole 13. Downward travel of the logging tool 12 will, on the other hand, cause the new and improved centralizers 10 and 11 to shift upwardly in relation to the tool body so that the upper collars, as at 15, will be engaged with their associated upper abutments as at 20; and the lower collars, as at 16, will instead move freely between the spaced abutments on the lower sleeves as at 18.

In any event, it will be appreciated that as the logging tool 12 is moved along the borehole 13, the outward faces of the mid-portions of the several centralizing springs, as at 14, will always be in rubbing contact with the rough walls of the borehole. As previously discussed, experience has shown that this rubbing contact with the walls of the borehole 13 will develop a significant "road" noise in the borehole which, if allowed to go unchecked, presents needless interference to the reception of acoustic logging signals by the logging tool 12.

Accordingly, in keeping with the objects of the present invention, it has been found that by overlaying a substantial part of the inward faces of the mid-portions of each of the several spring members, as at 14, of the new and improved centralizers 10 and 11 with a noise-attenuating composite material as shown generally at 22, there will be a significant overall reduction in "road" noise present in the borehole 13. As illustrated in the drawings, in its preferred arrangement this noise-attenuating composite material 22 is comprised of a substantial number of small lead pellets or granulated lead particles which are uniformly interspersed throughout an elastomer such as "Hycar" rubber as presently manufactured by Goodrich Rubber Company.

In the preferred embodiment of the present invention, the soune-attenuating material 22 was made to be about twice the thickness of the centralizing springs, as at 14, and was extended uniformly along about the middle one-third of each of the spring members. In preparing the composite material 22 for this preferred arrangement, lead balls or pellets of about 0.050-inch (1.25-mm) in diameter were introduced into and thoroughly mixed with unvulcanized Hycar rubber particles with the combined volume of the balls being equal to about 30% of the overall volume of the final mixture. This prepared mixture was then rolled out into sheets of appropriate thickness and cut into pieces of desired dimensions, with each piece being respectively vulcanized in place by usual rubber-processing techniques on the rearward face of each of the several centralizer springs as at 14. In testing the new and improved centralizers 10 and 11 arranged and fabricated as described above, it was found that with those centralizers the overall level of acoustic "road" noise in a borehole, as at 13, was only about 25–30% of the noise level ordinarily generated by prior-art centralizers which, except for the omission of the noise-abatement elements 22, were otherwise the same as the new and improved centralizers of the present invention.

Accordingly, it will be appreciated that the present invention has provided new and improved bowspring centralizers which are especially adapted for service with acoustic-logging tools. By virtue of the unique noise-abatement elements mounted only on the inward faces of the centralizer springs, there will be a substantial and significant reduction in the overall acoustic noise level generated in a well bore by the rubbing contact of the outer faces of the centralizer springs along the well bore walls.

While only a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:
1. Acoustic well-logging apparatus comprising:
   a tool body adapted for movement through a well bore;
   acoustic transducer means cooperatively arranged on said tool body and adapted for directing energy at a selected acoustic frequency between spaced locations on a well bore wall; and
   positioning means cooperatively arranged on said tool body for maintaining said tool body in a selected lateral position in relation to a well bore wall and including at least one positioning member having one portion thereof coupled to said tool body and another portion thereof laterally spaced from said tool body and having an outwardly-facing wall-engaging surface adapted for sliding engagement along a well bore wall, and noise-dampening means comprising a composite material bonded to at least the inwardly-facing surface of said other portion of said positioning member and substantially consisting of an elastomer containing a substantial number of interspersed particles of a sound-dampening material for reducing the level of noise at said selected acoustic frequency transmitted into a well bore upon sliding movement of said outwardly-facing wall-engaging surface along a well bore wall.

2. The well-logging apparatus of claim 1 wherein said particles are of lead and represent about 30% of the overall volume of said composite material.

3. The well-logging apparatus of claim 1 wherein said particles are lead balls of about 1.0 to 1.25-millimeters in diameter.

4. The well-logging apparatus of claim 1 wherein said particles are lead balls of about 1.0 to 1.25-millimeters in diameter and their combined volume equals about 30% of the overall volume of said composite material.

5. A well tool centralizer comprising:
   first and second members respectively adapted for attachment to longitudinally-spaced portions of an elongated well tool body;
   a plurality of outwardly-bowed elongated spring members disposed uniformly around said attachment members and extended therebetween;
   first and second coupling means movably coupling the opposite ends of said spring members respectively to said first and second attachment members and cooperatively arranged for accommodating longitudinal movement of at least one set of said spring ends in relation to one of said attachment members as the intermediate portions of said spring members move laterally between extended and retracted positions; and
   noise-attenuating means substantially consisting of an elastomeric material containing a substantial number of interspersed lead particles and cooperatively arranged only on the inwardly-facing surfaces of at least said intermediate portions of said spring members for reducing the level of noise at acoustic frequencies transmitted into a well bore upon sliding movement of the outwardly-facing surfaces of said intermediate portions of said spring members along the walls of a well bore.

6. The centralizer of claim 1 wherein said elastomeric material is secured to said inwardly-facing surfaces and contains a substantial number of interspersed lead particles representing about 30% of the overall volume of said elastomeric material.

7. A well tool centralizer comprising:

first and second sleeve members respectively adapted for attachment to longitudinally-spaced portions of an elongated well tool body;

first and second collars respectively mounted on said first and second sleeve members and adapted for longitudinal movement relative thereto;

at least three outwardly-bowed elongated spring members disposed uniformly around said first and second sleeve members and extended therebetween;

first and second means movably coupling the opposite ends of said spring members respectively to said first and second collars and cooperatively arranged for accommodating longitudinal movement thereof along said sleeve members as the intermediate portions of said spring members move laterally between extended and retracted positions; and noise-dampening means comprising a strip of an elastomeric material containing a substantial number of interspersed particles of a sound-dampening material cooperatively secured on the inwardly-facing surfaces of at least said intermediate portions of said spring members for reducing the level of noise at acoustic frequencies transmitted into a well bore upon sliding movement of the outwardly-facing surfaces of said intermediate portions of said spring members along the walls of a well bore.

8. The centralizer of claim 7 wherein said elastomeric material is bonded to each of said inwardly-facing surfaces and substantially consists of an elastomer containing a substantial number of interspersed particles of lead.

9. The centralizer of claim 8 wherein said lead particles represent about 30% of the overall volume of said composite material.

10. The centralizer of claim 8 wherein said lead particles are balls of about 1.0 to 1.25-millimeters in diameter.

11. The centralizer of claim 8 wherein said lead particles are balls of about one millimeter in diameter and their combined volume equals about 30% of the overall volume of said composite material.

12. Acoustic well-logging apparatus comprising:

a tool body adapted for movement through a well bore;

upper and lower acoustic transducer means cooperatively arranged on said tool body and adapted for directing energy at a selected acoustic frequency between longitudinally-spaced locations on a well bore wall respectively adjacent to said upper and lower transducer means;

tool-centralizing means cooperatively arranged on said tool body for substantially centering said tool body in a well bore and including at least one set of outwardly-bowed centralizing spring members uniformly spaced around said tool body and having their upper and lower ends operatively coupled thereto for movement relative to said tool body for accommodating lateral movements of the intermediate wall-engaging portions of said spring members between extended and retracted positions; and noise-dampening means comprising a strip of an elastomeric material containing a substantial number of interspersed particles of a sound-dampening material and cooperatively secured on the inwardly-facing surfaces of at least said intermediate portions of said spring members for reducing the level of noise at acoustic frequencies transmitted into a well bore upon sliding movement of the outwardly-facing surfaces of said intermediate portions of said spring members along the walls of a well bore.

13. The well-logging apparatus of claim 12 wherein said elastomeric material is bonded to each of said inwardly-facing surfaces and substantially consists of an elastomer containing a substantial number of interspersed particles of lead.

14. The well-logging apparatus of claim 13 wherein said lead particles represent about 30% of the overall volume of said composite material.

15. The well-logging apparatus of claim 13 wherein said lead particles are balls of about 1.0 to 1.25-millimeters in diameter.

16. The well-logging apparatus of claim 13 wherein said lead particles are balls of about one millimeter in diameter and their combined volume equals about 30% of the overall volume of said composite material.

* * * * *